United States Patent
Rydenhag et al.

(10) Patent No.: US 9,619,038 B2
(45) Date of Patent: *Apr. 11, 2017

(54) ELECTRONIC DEVICE AND METHOD OF DISPLAYING A COVER IMAGE AND AN APPLICATION IMAGE FROM A LOW POWER CONDITION

(71) Applicant: BlackBerry Limited, Waterloo (CA)

(72) Inventors: Daniel Tobias Rydenhag, Gothenburg (SE); Donald James Lindsay, Mountain View, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 464 days.

This patent is subject to a terminal disclaimer.

(21) Appl. No.: 13/746,753

(22) Filed: Jan. 22, 2013

(65) Prior Publication Data

US 2013/0191791 A1    Jul. 25, 2013

Related U.S. Application Data

(63) Continuation-in-part of application No. 13/356,070, filed on Jan. 23, 2012.

(51) Int. Cl.
*G06F 3/01* (2006.01)
*G06F 3/0488* (2013.01)

(52) U.S. Cl.
CPC .......... *G06F 3/017* (2013.01); *G06F 3/04883* (2013.01)

(58) Field of Classification Search
CPC ................................................. G06F 3/04883
See application file for complete search history.

(56) References Cited

U.S. PATENT DOCUMENTS

| | | |
|---|---|---|
| 5,305,435 A | 4/1994 | Bronson |
| 5,570,109 A | 10/1996 | Jenson |
| 5,651,107 A | 7/1997 | Frank et al. |
| 5,668,960 A | 9/1997 | Kataoka |
| 6,073,109 A | 6/2000 | Flores et al. |
| 6,333,973 B1 | 12/2001 | Smith et al. |
| 6,584,181 B1 | 6/2003 | Aktas et al. |
| 7,250,955 B1 | 7/2007 | Beeman et al. |
| 7,283,808 B2 | 10/2007 | Castell et al. |

(Continued)

FOREIGN PATENT DOCUMENTS

| | | |
|---|---|---|
| EP | 2015176 A1 | 1/2009 |
| EP | 2045700 A1 | 4/2009 |

(Continued)

OTHER PUBLICATIONS

United States Patent and Trademark Office, Office Action issued in connection with U.S. Appl. No. 13/356,070, dated Aug. 6, 2014, 92 pages.
European Patent Office, Communication pursuant to Rules 161(1) and 162 EPC, issued in connection with EP Application 12702697.9, dated Sep. 4, 2014, 2 pages.
"User Guide" Samsung Epic 4G, a Galaxy S Phone, Sprint Oct. 8, 2010, pp. 268.
Office Action issued Jul. 16, 2013, related U.S. Appl. No. 13/826,657, 31 pages.

(Continued)

*Primary Examiner* — Jennifer To
*Assistant Examiner* — Ashley Fortino
(74) *Attorney, Agent, or Firm* — Fish & Richardson P.C.

(57) ABSTRACT

A method includes entering, by a portable electronic device, a low-power condition and while in the low-power condition, detecting an input. In response to detecting the input, a cover image is displayed. An application image is progressively revealed along with movement of a gesture while reducing display of the cover image.

10 Claims, 8 Drawing Sheets

(56) References Cited

U.S. PATENT DOCUMENTS

| | | |
|---|---|---|
| 7,308,653 B2 | 12/2007 | Lin-Hendel |
| 7,370,284 B2 | 5/2008 | Andrea et al. |
| 7,385,875 B2 | 6/2008 | May et al. |
| 7,430,409 B2 | 9/2008 | Klassen et al. |
| 7,484,213 B2 | 1/2009 | Mathew et al. |
| 7,539,945 B2 | 5/2009 | Conrad et al. |
| 7,642,901 B2 | 1/2010 | Kato et al. |
| 7,647,559 B2 | 1/2010 | Yozell-Epstein et al. |
| 7,752,279 B2 | 7/2010 | Hardy et al. |
| 7,802,206 B1 | 9/2010 | Davis et al. |
| 7,844,915 B2 | 11/2010 | Platzer et al. |
| 7,900,074 B2 | 3/2011 | Reece et al. |
| 7,904,828 B2 | 3/2011 | Conrad et al. |
| 7,996,045 B1 | 8/2011 | Bauer et al. |
| 8,032,482 B2 | 10/2011 | Rosenberg et al. |
| 8,032,597 B2 | 10/2011 | Khoo |
| 8,082,518 B2 | 12/2011 | Flake et al. |
| 8,099,681 B2 | 1/2012 | Flanagan et al. |
| 8,122,364 B2 | 2/2012 | Yozell-Epstein et al. |
| 8,134,727 B1 | 3/2012 | Shmunis et al. |
| 8,140,115 B1 | 3/2012 | Kahn et al. |
| 8,140,975 B2 | 3/2012 | Lemay et al. |
| 8,176,411 B2 | 5/2012 | Palmieri |
| 8,237,664 B2 | 8/2012 | Swanbufg et al. |
| 8,239,785 B2 | 8/2012 | Hinckley et al. |
| 8,249,664 B1 | 8/2012 | Bauer et al. |
| 8,253,695 B2 | 8/2012 | Ganatra et al. |
| 8,271,660 B2 | 9/2012 | Schulzrinne et al. |
| 8,271,907 B2 | 9/2012 | Kim et al. |
| 8,280,962 B2 | 10/2012 | Muniz et al. |
| 8,291,344 B2 | 10/2012 | Chaudhri |
| 8,296,332 B2 | 10/2012 | Boley et al. |
| 8,300,005 B2 | 10/2012 | Tateuchi et al. |
| 8,301,701 B2 | 10/2012 | Goodman et al. |
| 8,356,256 B2 | 1/2013 | Olsen |
| 8,359,017 B2 | 1/2013 | Bruchelt |
| 8,359,335 B2 | 1/2013 | Coker et al. |
| 8,392,837 B2 | 3/2013 | Li |
| 8,402,384 B2 | 3/2013 | Scott |
| 8,453,057 B2 | 5/2013 | Stallings et al. |
| 8,473,843 B2 | 6/2013 | Lundy et al. |
| 8,479,122 B2 | 7/2013 | Hotelling et al. |
| 2002/0098831 A1 | 7/2002 | Castell et al. |
| 2002/0126155 A1 | 9/2002 | Lin-Hendel |
| 2003/0070000 A1 | 4/2003 | Coker et al. |
| 2004/0068545 A1 | 4/2004 | Daniell et al. |
| 2004/0117451 A1 | 6/2004 | Chung |
| 2004/0128353 A1 | 7/2004 | Goodman et al. |
| 2004/0196259 A1 | 10/2004 | Bradski |
| 2004/0243677 A1 | 12/2004 | Curbow et al. |
| 2005/0108655 A1 | 5/2005 | Andrea et al. |
| 2006/0026521 A1 | 2/2006 | Hotelling et al. |
| 2006/0075046 A1 | 4/2006 | Yozell-Epstein et al. |
| 2006/0123360 A1 | 6/2006 | Anwar et al. |
| 2006/0156240 A1 | 7/2006 | Lemay et al. |
| 2006/0190833 A1 | 8/2006 | Sangiovanni et al. |
| 2006/0250377 A1 | 11/2006 | Zadesky et al. |
| 2006/0270461 A1 | 11/2006 | Won et al. |
| 2006/0284852 A1 | 12/2006 | Hofmeister et al. |
| 2007/0011258 A1 | 1/2007 | Khoo |
| 2007/0016958 A1 | 1/2007 | Bodepudi et al. |
| 2007/0083600 A1 | 4/2007 | Bakos et al. |
| 2007/0106939 A1 | 5/2007 | Qassoudi |
| 2007/0139372 A1 | 6/2007 | Swanburg et al. |
| 2007/0152977 A1 | 7/2007 | Ng et al. |
| 2007/0220444 A1 | 9/2007 | Sunday et al. |
| 2007/0236468 A1 | 10/2007 | Tuli |
| 2007/0256035 A1 | 11/2007 | Matsuzawa et al. |
| 2008/0005247 A9 | 1/2008 | Khoo |
| 2008/0008163 A1 | 1/2008 | Castell et al. |
| 2008/0034047 A1 | 2/2008 | Rosenberg et al. |
| 2008/0046824 A1 | 2/2008 | Li et al. |
| 2008/0094369 A1 | 4/2008 | Ganatra et al. |
| 2008/0165151 A1 | 7/2008 | Lemay et al. |
| 2008/0165160 A1 | 7/2008 | Kocienda |
| 2008/0174570 A1 | 7/2008 | Jobs et al. |
| 2008/0189622 A1 | 8/2008 | Sanchez et al. |
| 2008/0261569 A1 | 10/2008 | Britt et al. |
| 2008/0272927 A1 | 11/2008 | Woolley et al. |
| 2008/0273014 A1 | 11/2008 | Lowles et al. |
| 2009/0006991 A1 | 1/2009 | Lindberg et al. |
| 2009/0013282 A1 | 1/2009 | Mercer |
| 2009/0064055 A1 | 3/2009 | Chaudhri et al. |
| 2009/0094562 A1 | 4/2009 | Jeong et al. |
| 2009/0144661 A1 | 6/2009 | Nakajima et al. |
| 2009/0174679 A1 | 7/2009 | Westerman |
| 2009/0195518 A1 | 8/2009 | Mattice et al. |
| 2009/0199130 A1 | 8/2009 | Tsern et al. |
| 2009/0237367 A1 | 9/2009 | Ryu et al. |
| 2009/0241072 A1* | 9/2009 | Chaudhri et al. ............ 715/863 |
| 2009/0249247 A1 | 10/2009 | Tseng et al. |
| 2009/0252312 A1 | 10/2009 | Muniz et al. |
| 2009/0267909 A1 | 10/2009 | Chen et al. |
| 2009/0273583 A1 | 11/2009 | Norhammar |
| 2009/0278806 A1 | 11/2009 | Duarte et al. |
| 2009/0292690 A1 | 11/2009 | Culbert |
| 2009/0295753 A1 | 12/2009 | King et al. |
| 2009/0307631 A1 | 12/2009 | Kim et al. |
| 2010/0011304 A1 | 1/2010 | Van Os |
| 2010/0013782 A1 | 1/2010 | Liu et al. |
| 2010/0017695 A1 | 1/2010 | Palmieri |
| 2010/0042954 A1 | 2/2010 | Rosenblatt et al. |
| 2010/0058226 A1 | 3/2010 | Flake et al. |
| 2010/0060586 A1 | 3/2010 | Pisula et al. |
| 2010/0066698 A1 | 3/2010 | Seo |
| 2010/0079392 A1 | 4/2010 | Chiang et al. |
| 2010/0095224 A1 | 4/2010 | Yozell-Epstein et al. |
| 2010/0095239 A1 | 4/2010 | McCommons et al. |
| 2010/0107067 A1 | 4/2010 | Vaisanen et al. |
| 2010/0153951 A1 | 6/2010 | Jones |
| 2010/0156656 A1 | 6/2010 | Duarte et al. |
| 2010/0169722 A1 | 7/2010 | Wu et al. |
| 2010/0171753 A1* | 7/2010 | Kwon ............................ 345/593 |
| 2010/0175018 A1 | 7/2010 | Petschnig et al. |
| 2010/0182248 A1 | 7/2010 | Chu |
| 2010/0185989 A1 | 7/2010 | Shiplacoff et al. |
| 2010/0214237 A1 | 8/2010 | Echeverri et al. |
| 2010/0218130 A1 | 8/2010 | Conrad et al. |
| 2010/0231533 A1 | 9/2010 | Chaudhri |
| 2010/0248689 A1 | 9/2010 | Teng et al. |
| 2010/0251178 A1 | 9/2010 | Lee et al. |
| 2010/0257490 A1* | 10/2010 | Lyon ..................... G06F 3/0488 715/863 |
| 2010/0289760 A1 | 11/2010 | Jonoshita et al. |
| 2010/0295772 A1 | 11/2010 | Alameh et al. |
| 2010/0302172 A1 | 12/2010 | Wilairat |
| 2010/0306693 A1 | 12/2010 | Brinda |
| 2010/0306705 A1 | 12/2010 | Nilsson |
| 2011/0029927 A1 | 2/2011 | Lietzke et al. |
| 2011/0034208 A1 | 2/2011 | Gu et al. |
| 2011/0083111 A1 | 4/2011 | Forutanpour et al. |
| 2011/0099490 A1 | 4/2011 | Barraclough et al. |
| 2011/0163944 A1 | 7/2011 | Bilbrey et al. |
| 2011/0163970 A1 | 7/2011 | Lemay |
| 2011/0175839 A1 | 7/2011 | Prabhu |
| 2011/0185318 A1 | 7/2011 | Hinckley et al. |
| 2011/0209088 A1 | 8/2011 | Hinckley et al. |
| 2011/0209097 A1 | 8/2011 | Hinckley et al. |
| 2011/0209104 A1 | 8/2011 | Hinckley et al. |
| 2011/0210983 A1 | 9/2011 | Theimer et al. |
| 2011/0231499 A1 | 9/2011 | Stovicek et al. |
| 2011/0252369 A1 | 10/2011 | Chaudhri |
| 2011/0252381 A1 | 10/2011 | Chaudhri |
| 2011/0256848 A1 | 10/2011 | Bok et al. |
| 2011/0294467 A1 | 12/2011 | Kim et al. |
| 2012/0013552 A1 | 1/2012 | Ahn |
| 2012/0026194 A1 | 2/2012 | Wagner et al. |
| 2012/0032979 A1 | 2/2012 | Blow et al. |
| 2012/0084697 A1 | 4/2012 | Reeves |
| 2012/0084698 A1 | 4/2012 | Sirpal et al. |
| 2012/0090004 A1 | 4/2012 | Jeong |
| 2012/0105358 A1 | 5/2012 | Momeyer et al. |
| 2012/0115449 A1 | 5/2012 | Bruchelt |

(56) References Cited

U.S. PATENT DOCUMENTS

| | | | |
|---|---|---|---|
| 2012/0131519 A1* | 5/2012 | Jitkoff | G06F 3/0481 715/863 |
| 2012/0159380 A1 | 6/2012 | Kocienda et al. | |
| 2012/0192108 A1 | 7/2012 | Kolb | |
| 2012/0206392 A1 | 8/2012 | Ng et al. | |
| 2012/0210214 A1 | 8/2012 | Yoo et al. | |
| 2012/0266082 A1 | 10/2012 | Webber | |
| 2012/0280917 A1 | 11/2012 | Toksvig et al. | |
| 2012/0284673 A1 | 11/2012 | Lamb et al. | |
| 2012/0290946 A1 | 11/2012 | Schrock et al. | |
| 2012/0304108 A1 | 11/2012 | Jarrett | |
| 2012/0311444 A1 | 12/2012 | Chaudhri | |
| 2012/0326984 A1 | 12/2012 | Ghassabian | |
| 2013/0002524 A1 | 1/2013 | Sirpal et al. | |
| 2013/0033477 A1 | 2/2013 | Sirpal et al. | |
| 2013/0080960 A1* | 3/2013 | McRae et al. | 715/772 |
| 2013/0083260 A1 | 4/2013 | Minami | |
| 2013/0167066 A1 | 6/2013 | Scott | |
| 2013/0185650 A1 | 7/2013 | Gutowitz | |

FOREIGN PATENT DOCUMENTS

| | | |
|---|---|---|
| EP | 2068236 A1 | 6/2009 |
| EP | 2109030 A2 | 10/2009 |
| EP | 2383636 A1 | 11/2011 |
| EP | 2458493 A3 | 5/2012 |
| EP | 2485138 A1 | 8/2012 |
| KR | 10-2008-0041309 A | 5/2008 |
| KR | 10-2009-0036578 A | 4/2009 |
| KR | 10-2010-0032660 A | 3/2010 |
| KR | 20100089376 | 8/2010 |
| WO | 2004051451 A3 | 6/2004 |
| WO | 2009097555 A2 | 8/2009 |
| WO | 2009120925 A2 | 10/2009 |
| WO | 2010040670 A2 | 4/2010 |
| WO | 2011037366 | 3/2011 |
| WO | 2012097385 A2 | 7/2012 |
| WO | 2012128795 A1 | 9/2012 |

OTHER PUBLICATIONS

International Searching Authority, International Search Report and Written Opinion issued in related International Application No. PCT/US2013/022511, dated May 10, 2013, 10 pages.
Office Action in related U.S. Appl. No. 13/619,213 issued Apr. 18, 2013, 47 pages.
http://www.evernote.com/peek/ Retrieved Aug. 27, 2012, 2 pages.
Microsoft, "Cross Sliding State enumeration", internet article, http://www.msdn.microsoft.com/en-us/library/windows/apps/windows.ui.input.crosslidingstate , Retrieved Sep. 4, 2012, 2 pages.
Levesque, et al., Frictional Widgets: Enhancing Touch Interfaces with Programmable Friction, published CHI 2011, ACM 978-1-4503-0268-5/11/05, May 7-12, 2011, 6 pages.
http://www.jimblackler.net/blog/?p=67/ "QuickCalendar, an application for Android written in Java" Retrieved Oct. 18, 2012, 6 pages.
Apple, iOS: Understanding Notifications, http://support.apple.com/kb/HT3576[Oct. 18, 2012 6:05:38 PM], last modified Sep. 19, 2012, 3 pages.
Google, Android 2.3 User's Guide, AUG-2.3-103 Android™ mobile technology platform 2.3, Dec. 13, 2010, 380 pages (English Language Version).
Google, Android 2.3 User's Guide, AUG-2.3-103-KO Android™ mobile technology platform 2.3, Dec. 13, 2010, 368 pages (Korean Language Version).
International Searching Authority, International Search Report and Written Opinion issued in international application No. PCT/US2011/062892, dated Feb. 7, 2012, 12 pages.
Office Action issued in corresponding U.S. Appl. No. 13/619,213 issued Nov. 19, 2012, 36 pages.
http://www.gigaom.com/2011/10/12/ios-5-notifications-and-notification-center/, Retrieved May 2, 2013, Asch, Josh, "iOS 5: Notifications and Notification Center", Tech News and Analysis, Oct. 12, 2011, four pages.
Extended European Search Report issued in EP Application No. 13740937.1 on Sep. 17, 2015; 7 pages.

* cited by examiner

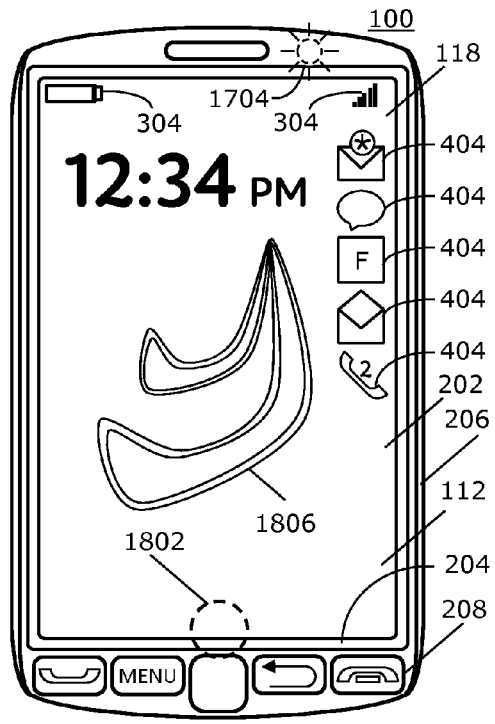
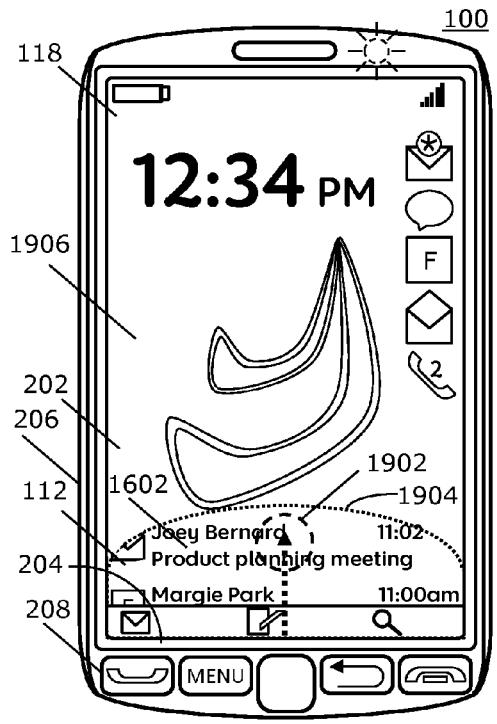
FIG. 18
FIG. 19
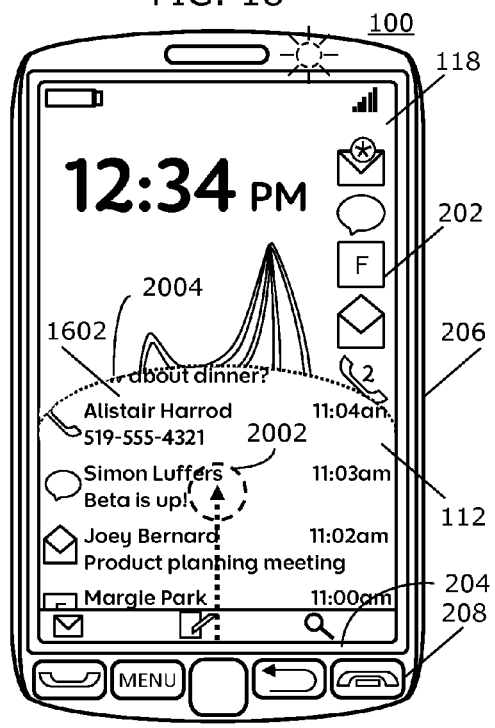
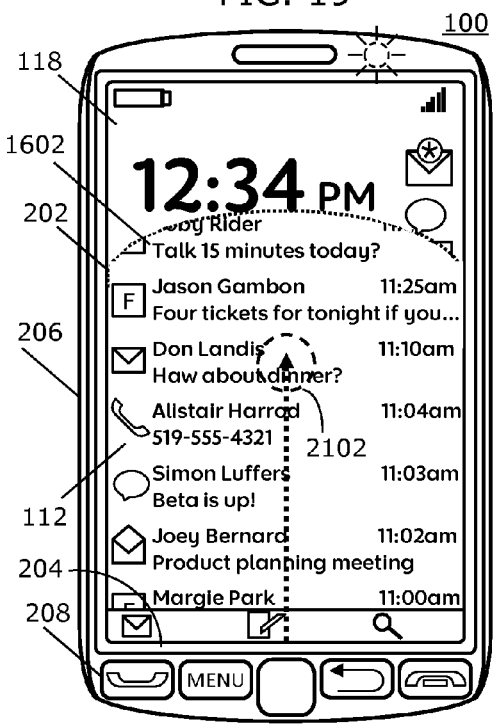
FIG. 20
FIG. 21

ELECTRONIC DEVICE AND METHOD OF DISPLAYING A COVER IMAGE AND AN APPLICATION IMAGE FROM A LOW POWER CONDITION

CROSS REFERENCE TO RELATED APPLICATIONS

This patent application is a continuation-in-part of and claims priority to U.S. patent application Ser. No. 13/356,070, filed on Jan. 23, 2012, titled "ELECTRONIC DEVICE AND METHOD OF CONTROLLING A DISPLAY," the contents of which application are incorporated herein by reference in its entirety.

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

BRIEF DESCRIPTION OF THE DRAWINGS

FIG. 9 through FIG. 14 and FIG. 16 through FIG. 25 illustrate examples of progressively displaying information from a low-power condition on a portable electronic device in accordance with the disclosure.

DETAILED DESCRIPTION

Figure 1:
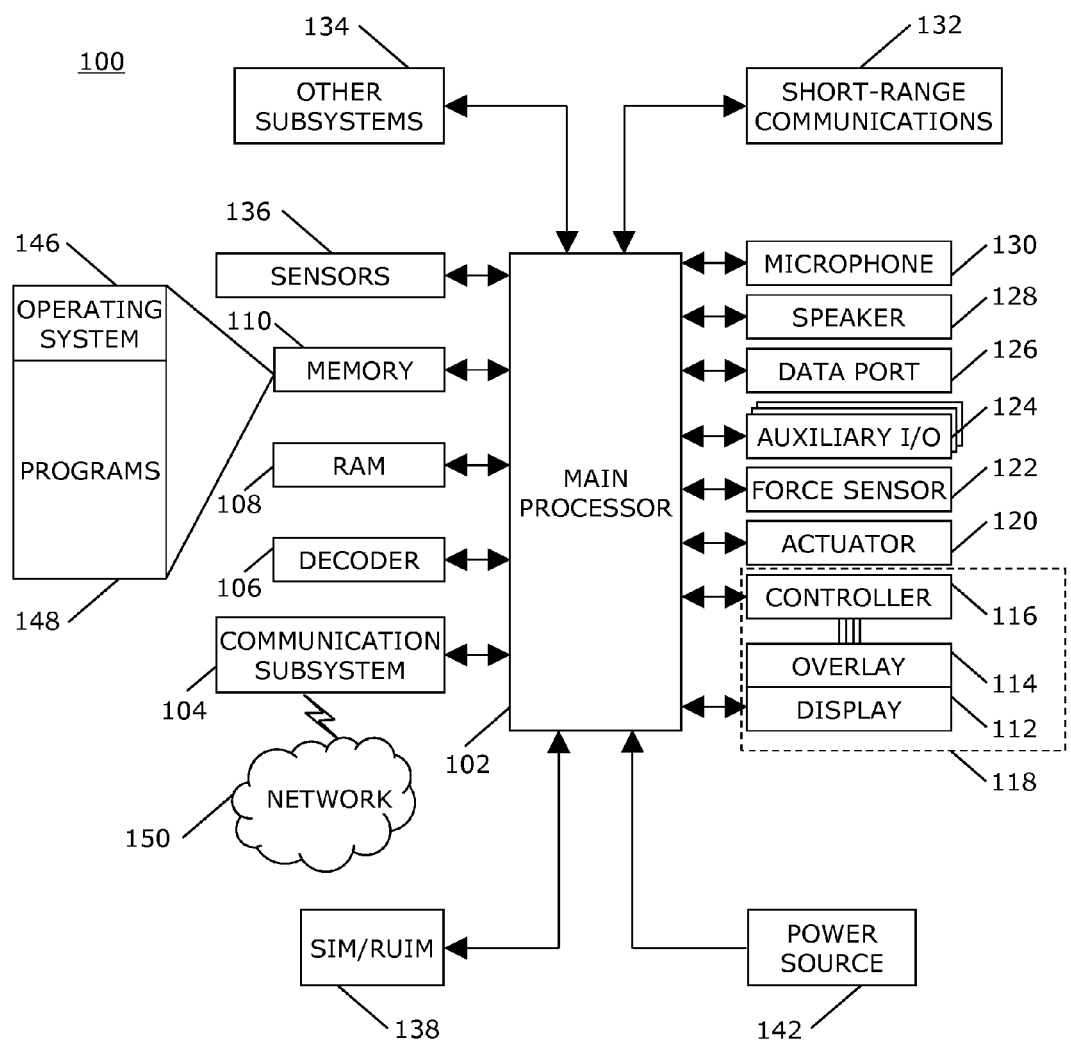
FIG. 1 is a block diagram of an electronic device such as a portable electronic device in accordance with the disclosure.

The following describes an apparatus for and method of controlling a display. A gesture is detected while the display is in a low-power condition also referred to as a sleep state. The device may or may not be locked in the low-power condition. Informational icons to be displayed are identified, such as icons associated notifications of application information, such as email or text messaging, or device information, such as time or battery level. In one example, while the gesture continues to be detected, e.g., by a touch-sensitive display, the display is progressively illuminated while displaying the identified informational icons. The process may be reversed, for example, by changing the direction of the gesture or by releasing contact with the touch-sensitive display.

A gesture includes a static or moving touch detected by a touch-sensitive display, a 3-dimensional (3D) spatial movement detected by spatial sensors, a touch or 3D spatial movement detected by an optical sensor, an audible input, including a voice command, detected by a speech or audible recognition device, depression of a physical key or button, and so forth. Other types of gestures may be successfully utilized.

Although many examples described herein refer to a gesture detected by a touch-sensitive display, other methods of gesture detection may be utilized. For example, a gesture may be a generalized trajectory description characterized as a sequence of 3D points in time, and as such many different sensors may be utilized to detect such a gesture. The gesture may be performed by moving a portable electronic device or moving one or more body parts, such as fingers or thumbs as a 3D spatial gesture. For example, sensors, such as an accelerometer/gyroscope, or proximity sensors, or time-of-flight cameras may detect such gestures. Gesture recognition and detection techniques of this type are known.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 optionally including a touch-sensitive overlay 114 operably coupled to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. Input via a graphical user interface is provided via the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The display 112 may be any suitable type of display, including a liquid crystal display (LCD), an organic light-emitting diode (OLED) display, and so forth. The processor 102 may interact with an one or more spatial sensors 136, including accelerometers or gyroscopes that may be utilized to detect direction of gravitational forces or gravity-induced reaction forces, proximity sensors, optical sensors, and so forth.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

One or more touches, also known as touch contacts, touch events or gestures, may be detected by the touch-sensitive display 118. The processor 102 may determine attributes of the touch, including a location of a touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable input member, such as a finger, thumb, appendage, or other objects, for example, a stylus, pen, or other pointer, depending on the nature of the touch-sensitive display 118. Multiple simultaneous touches may be detected.

An accelerometer or gyroscope 136 may be utilized to detect 3D spatial gestures. A sequence of acceleration values may be detected in the different spatial dimensions as a function of time and constitute trajectory information that can be recognized as a gesture. For example, a quick flick or tilt of the portable electronic device 100 are examples of detectable gestures. A 3D spatial gesture includes a continuous movement, a sequence of movements, and a series of continuous movements or sequences of movements. Proximity sensors, optical sensors, and/or cameras may be utilized to detect 3D spatial gestures comprising motion of objects spaced from the device 100. Scanning of any of these sensors or devices may take place every 100 to 500 ms during low-power condition or at any other suitable time period.

The actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
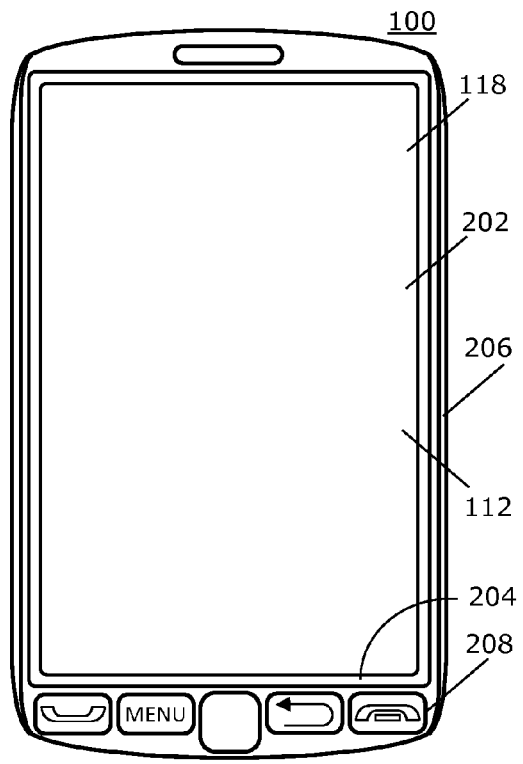
FIG. 2 is a front view of a portable electronic device in accordance with the disclosure.

A front view of a portable electronic device is shown in FIG. 2. The touch-sensitive display 118 includes a display area 202 in which information may be displayed, and a non-display area 204 extending around the periphery of the display area. The display area 202 generally corresponds to the area of the display 112. Information is not displayed in the non-display area 204 by the display 112, which non-display area 204 is utilized to accommodate, for example, electronic traces or electrical connections, adhesives or other sealants, and/or protective coatings around the edges of the display area. The non-display area 204 may be referred to as an inactive area. The non-display area 204 is typically not part of the physical housing or frame 206 of the electronic device. Typically, no pixels of the display 112 are in the non-display area 204, thus no image can be displayed by the display 112 in the non-display area 204. Optionally, a secondary display, not part of the primary display 112, may be disposed under the non-display area 204. Touch sensors may be disposed in the non-display area 204, which touch sensors may be extended from the touch sensors in the display area or distinct or separate touch sensors from the touch sensors in the display area 202. A touch, including a gesture, may be associated with the display area 202, the non-display area 204, or both areas. The touch sensors may extend across substantially the entire non-display area 204 or may be disposed in only part of the non-display area 204. Touches may be detected, for example, starting in the non-display area 204 and continuing into the display area 202 or starting in the display area 202 and continuing into the non-display area 204, whether or not touch sensors are disposed in the non-display area 204. The portable electronic device 100 optionally includes a set of convenience keys or buttons 208, 908 that may be separate physical keys or buttons or virtual keys or buttons. When the electronic device 100 is in a low-power condition, which may be referred to as a "sleep" condition or state, no information is displayed on the touch-sensitive display. During a low-power condition, processes with the electronic device 100 are discontinued or operated at a slower speed and one or more hardware components may be powered-down or operated at a slower speed to conserve power or provide other advantages.

Figure 3:
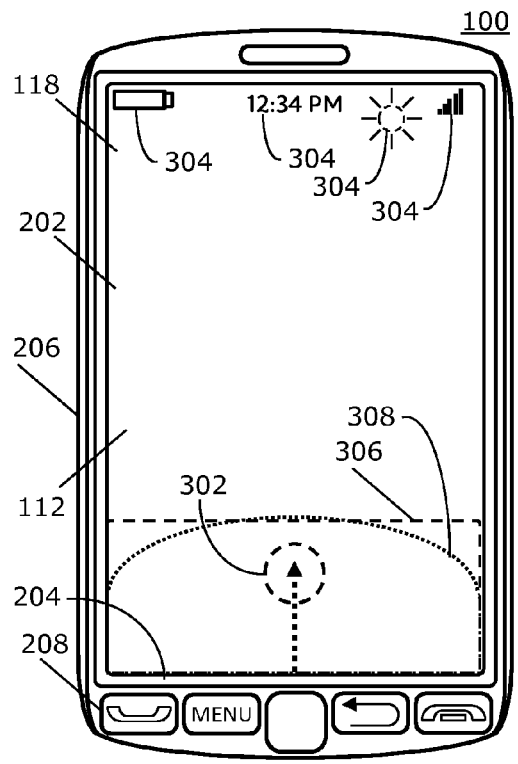
FIG. 3 through FIG. 7 illustrate examples of progressively displaying information from a low-power condition on a portable electronic device in accordance with the disclosure.
Figure 4:
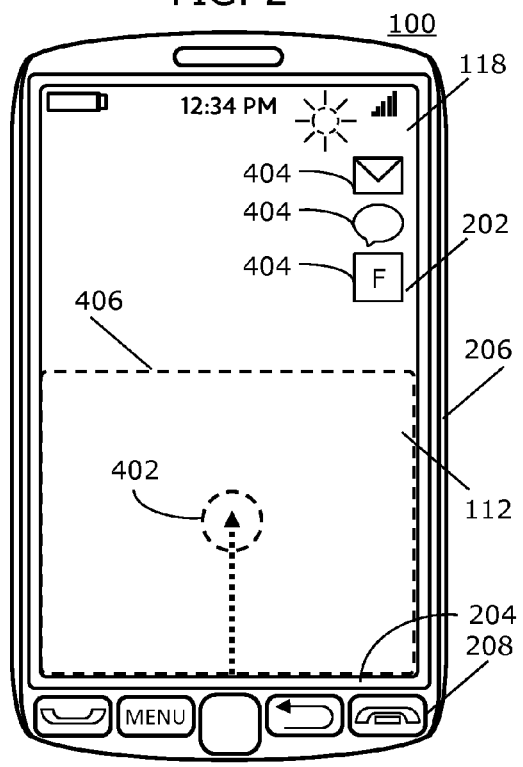
Figure 5:
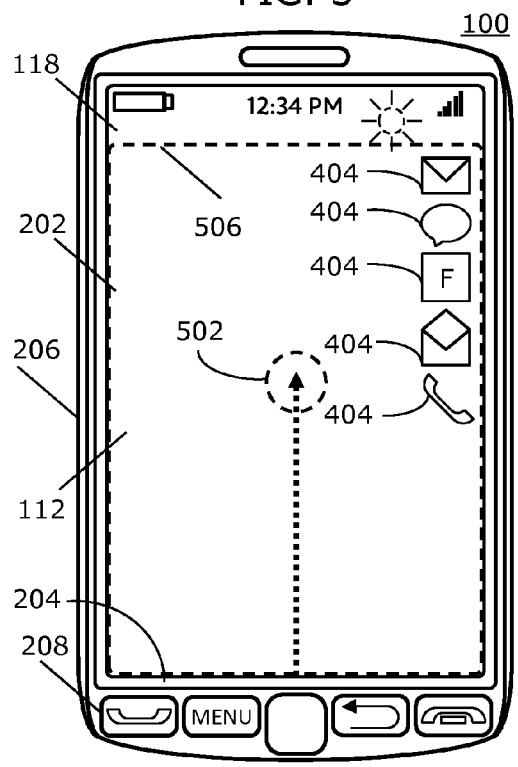

An example of progressively illuminating a display while displaying informational icons is shown in FIG. 3 through FIG. 5. In this portrait orientation example, a gesture is initially detected at or near the bottom of the touch-sensitive display 118 and continues to be detected along the path of the arrow. When the gesture is detected at the location 302 in FIG. 3, a small area 306 at the bottom of the display 118 is illuminated, and informational icons 304 related to device condition are displayed. The shape of the illuminated area may be a shape other than rectangular, such as the alternative curved area 308 that is similar to or simulates a glow of a sunrise.

The gesture continues to be detected as the gesture moves upward, as shown in FIG. 4. When the gesture is detected at the location 402 in FIG. 4, a larger area 406 at the bottom of the display 118 is illuminated, which area 406 is larger than the area 306, and informational icons 304 related to device condition are displayed in addition to informational icons 404 related to applications, such as email, text messaging, social networking, calendar, telephone, and so forth.

The gesture continues to be detected as the gesture continues to move upward, as shown in FIG. 5. When the gesture is detected at the location 502 in FIG. 5, a larger area 506 at the bottom of the display 118 is illuminated, which area 506 is larger than the area 406, and informational icons 304 related to device condition are displayed in addition to informational icons 404 related to applications. More informational icons 404 related to applications are displayed in FIG. 5 than in FIG. 4, illustrating that more informational icons are displayed as the gesture continues to be detected.

Figure 6:
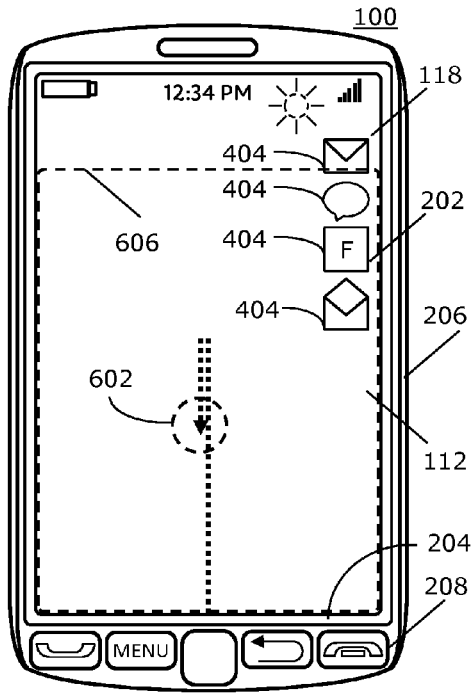

The gesture continues to be detected as the gesture reverses direction and continues downward to the location 602 shown in FIG. 6. The display 118 is progressively dimmed in this example as long as the direction of the gesture continues in the reverse direction. Fewer informational icons 404 are displayed in FIG. 6 than in FIG. 5, and the area of illumination 606 is smaller in FIG. 6 than in FIG. 5.

Figure 7:
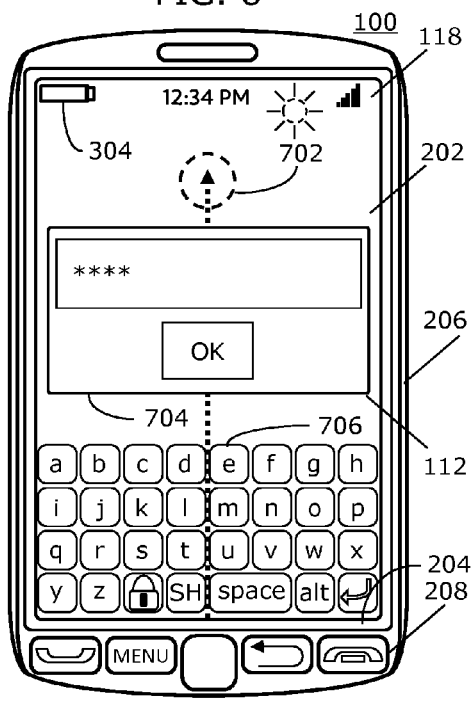

Alternatively, the gesture may continue upward from the bottom of the display until the gesture is detected at the touch location 702, which results in a gesture greater than or equal to a predetermined distance or length as shown in FIG. 7. An unlock option 704 is displayed in a window along with a keyboard 706 to facilitate entry of a password. In this example, the informational icons 304 related to device condition are displayed, although informational icons 404 related to applications are no longer displayed.

Figure 8:
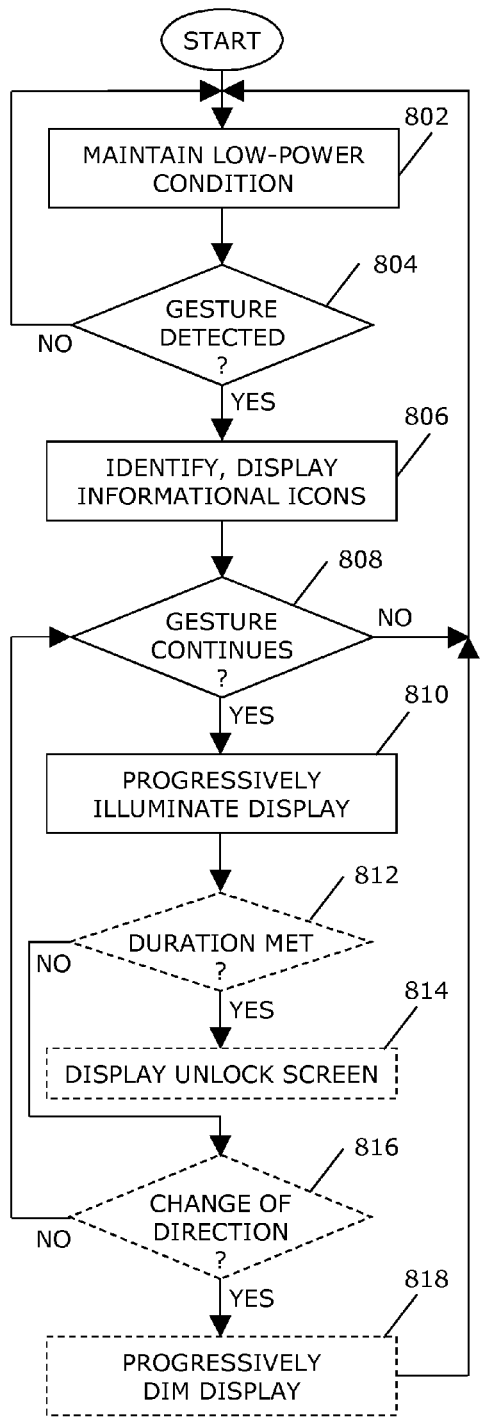
FIG. 8 and FIG. 15 is a flowchart illustrating a method of controlling a touch-sensitive display in accordance with the disclosure.

A flowchart illustrating a method of controlling a display such as a touch-sensitive display is shown in FIG. 8. The method may be carried out by software executed, for example, by the processor 102 of the electronic device, which may be a portable electronic device 100. Coding of software for carrying out such a method is within the scope of a person of ordinary skill in the art given the present description. The method may contain additional or fewer processes than shown and/or described, and may be performed in a different order. Computer-readable code executable by at least one processor of the electronic device to perform the method may be stored in a computer-readable storage medium, device, or apparatus, which may be a non-transitory or tangible storage medium, device, or apparatus.

The portable electronic device is maintained 802 in a low-power condition, for example, by displaying no information on the display 112 of the touch-sensitive display 118, e.g., the display 112 is blank or black with no pixels illuminated. For example, no background or wallpaper image is displayed. The processing activities of the device 100 are typically significantly reduced during a low-power condition. Minimal touch sensing is active on the touch-sensitive display 118, such that power usage is minimal. For example, scanning of touch sensors may take place every 100 to 500 ms or at a reduced rate from active touch sensing when in low-power condition. While the display 112/touch-sensitive display 118/electronic device 100 is in low-power condition, a gesture is detected 804 on the touch-sensitive display 118, which at least minimally wakes-up the device. The gesture may be a simple touch or a touch that moves. The gesture may be simple or complex. For example, the gesture may be a swipe that moves in a single direction along the display or a touch that hovers or is maintained at or near the same location. Any other gesture may be utilized. The gesture may begin anywhere on the touch-sensitive display 118, although advantage may be gained, for example, by detecting a touch starting at any edge of the display, such as the bottom of the display or a corner of the display. The gesture may be a series or sequence of taps on the touch-sensitive display 118. The location of the taps may or may not be relevant to detecting the gesture.

Informational icons 304, 404 are identified and displayed 806. Identifying informational icons 304, 404 includes, for example, identifying at least one notification to be displayed. Notifications include, for example, notice of a received email, notice of a text message, notice of a missed phone call, a calendar event, a social networking notice, device condition, and so forth. Device conditions include, for example, time of day, date, battery level, network signal strength indication, error condition, software problem, and so forth. Informational icons 304, 404 that are associated with each notification are identified and displayed, such as an envelope for email, a balloon for a text message, a phone for a missed call, an open envelope for a meeting invitation, and so forth. All of the informational icons 304, 404 identified at 806 may be displayed upon detection of the gesture. Alternatively, the informational icons 304, 404 may be progressively or gradually displayed while the gesture is continuously detected, e.g., the quantity of informational icons 304, 404 increases, such as one at a time as the gesture continues 808. Alternatively, the informational icons 304, 404 may be gradually displayed or revealed as the gesture is continuously detected. This effect may be achieved by progressively decreasing the transparency of the displayed informational icons 304, 404, e.g., starting with a transparent or ghosted version of the icon and gradually increasing the opacity of the icon 304, 404 until the informational icons 304, 404 are fully displayed. Transparency in this sense includes the visual effect of being able to see the background through the icons 304, 404. Increasing the opacity of the icon 304, 404 includes reducing the amount of background visible through the icon 304, 404 until to the background cannot be seen through the icon 304, 404 anymore.

While detection of the gesture continues 808, the touch-sensitive display 118 is progressively illuminated 810 while displaying the identified informational icons 304, 404, such as described above. Detection of the gesture continuing includes detecting a continuation of the gesture's movement along the touch-sensitive display 118 and/or detecting a continuation of the gesture in time at or near a single location on the touch-sensitive display 118, e.g., a successive tap with little or no movement of the gesture. The gesture may include a combination of movement and holding of a touch at or near one location on the display 118. Progressively illuminating the display 118 may be performed in a number of ways. For example, the touch-sensitive display 118 may be illuminated beginning at the one end of the display and continuing toward an opposite end of the display, such as shown in the examples in FIG. 3 through FIG. 7 and FIG. 9 through FIG. 13. A more particular example of progressively illuminating includes a sunrise effect, where the touch-sensitive display 118 is first illuminated at the bottom of the display 118 and gradually illuminated more and more in a direction toward the top of the display 118 in a similar manner as a sunrise. The entire display may be fully lit at this point or optionally dimly lit, where continued detection of the gesture gradually increases brightness over most or all of the area of the touch-sensitive display 118. Alternatively, an image may be displayed on the display 118, and the brightness of the image may be gradually increased. Another form of progressively illuminating the display 118 comprises gradually illuminating the touch-sensitive display 118 beginning at a point, such as the center of the display 118 or the first detected touch location, and continuing to illuminate the display in at least one direction away from the point, such as shown in FIG. 14, which shows gradual illuminating in a gradually increasing circle or radially outward in all directions from a point on the display 118.

Figure 13:
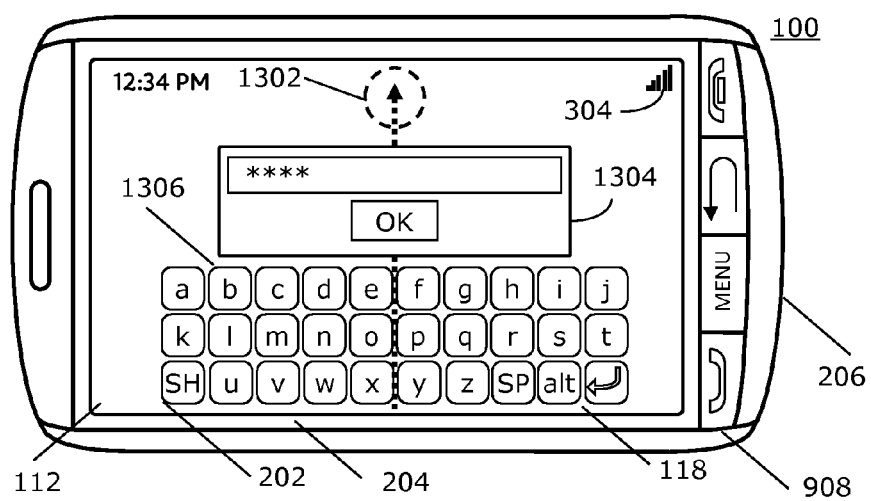
Figure 14:
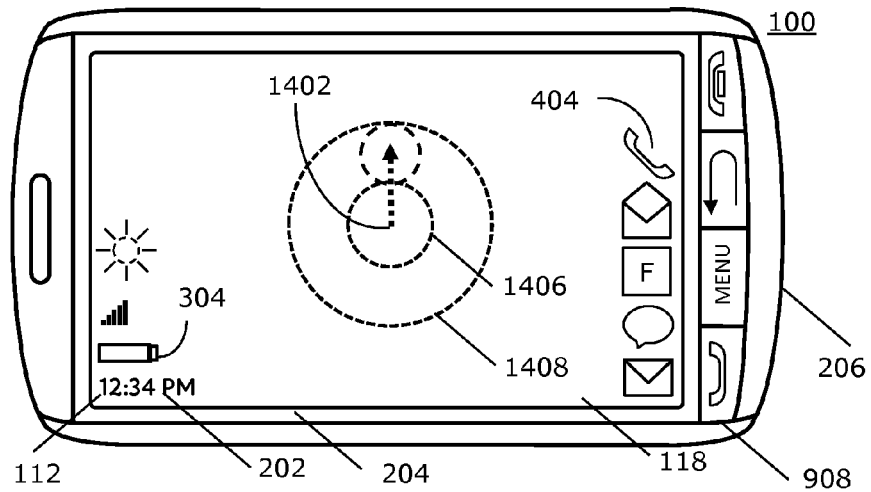

Optionally, when the duration of the gesture meets a predetermined threshold 812, such as a period of time or a distance or reaching a location on the display, an unlock option or screen is displayed 814, such as shown in FIG. 7 or FIG. 13. At any time detection of the gesture ends, the illumination of the touch-sensitive display is discontinued. This discontinuance of illumination may be effectively instantaneous or immediate or may quickly fade to black, e.g., in 100 to 500 ms or less.

Another option includes progressively dimming the display 118 after the display 118 is illuminated. For example, upon detection 816 of a change in direction of the gesture, illumination of the touch-sensitive display 118 may be progressively reduced as the gesture continues. In a more specific example, the gesture may comprise a touch beginning at the bottom of the display 118 and moving toward the top of the display, followed by moving back toward the bottom of the display 118, such as when the user sees all or as many of the informational icons 304, 404 as desired. In this situation, the touch-sensitive display 118 is gradually illuminated until the touch is detected moving back toward the bottom of the display 118, at which time the display 118 is progressively dimmed 818 until the gesture ends (detection of the gesture does not continue), the display 118 fades to black, or the gesture changes direction again to progressively illuminate the display 118, in which case the process continues at 810. An end of the gesture may be discontinuation of detection of touch data on the touch-sensitive display 118, discontinuation of a recognizable 3D spatial gesture, or end of any other type of gesture. The gesture may be discontinued, for example, when a user gathered the information the user is interested in, such as time, date, notifications, and so forth. An end of the gesture or when the gesture meets a predetermined criterion returns the device 100 to the previous low-power or sleep condition.

Figure 9:
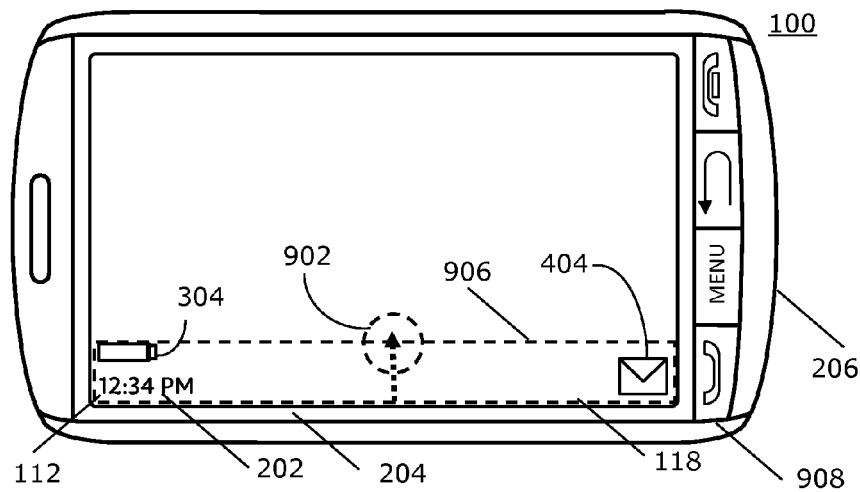
Figure 10:
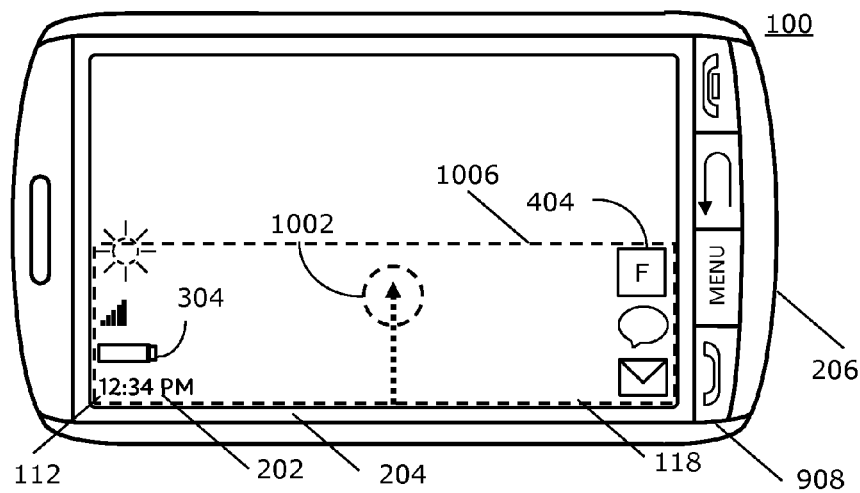
Figure 11:
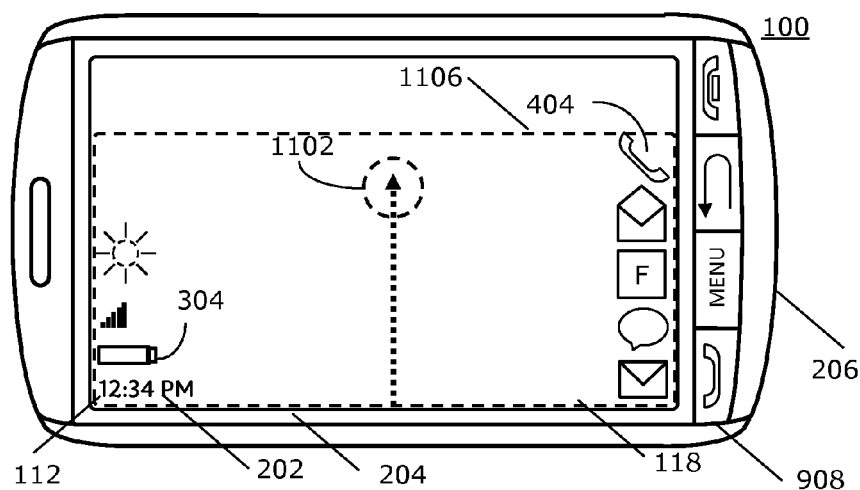

Another example of progressively illuminating a display while displaying informational icons is shown in FIG. 9 through FIG. 11. In this landscape orientation example, a gesture is initially detected at or near the bottom of the touch-sensitive display 118 and continues to be detected along the path of the arrow. When the gesture is detected at the location 902 in FIG. 9, a small area 906 at the bottom of the display 118 is illuminated, and informational icons 304 related to device condition and an informational icon 404 related to application are displayed.

The gesture continues to be detected as the gesture moves upward, as shown in FIG. 10. When the gesture is detected at the location 1002 in FIG. 10, a larger area 1006 at the bottom of the display 118 is illuminated, which area 1006 is larger than the area 906, and informational icons 304 related to device condition are displayed in addition to informational icons 404 related to applications. More informational icons 304 related to device condition and informational icons 404 related to applications are displayed in FIG. 10 than FIG. 9, as the gesture continues.

The gesture continues to be detected as the gesture continues to move upward, as shown in FIG. 11. When the gesture is detected at the location 1102 in FIG. 11, a larger area 1106 at the bottom of the display 118 is illuminated, which area 1106 is larger than the area 1006, and informational icons 304 related to device condition are displayed in addition to informational icons 404 related to applications. More informational icons 404 related to applications are displayed in FIG. 11 than in FIG. 10, illustrating that more informational icons are displayed as the gesture continues to be detected. One advantage of the examples of FIG. 9 through FIG. 13 is that the informational icons are displayed in the area where the display is illuminated, thereby reducing power on an OLED display, because a black OLED pixel consumes negligible power, or reducing the time needed for a user to obtain information from the informational icons.

Figure 12:
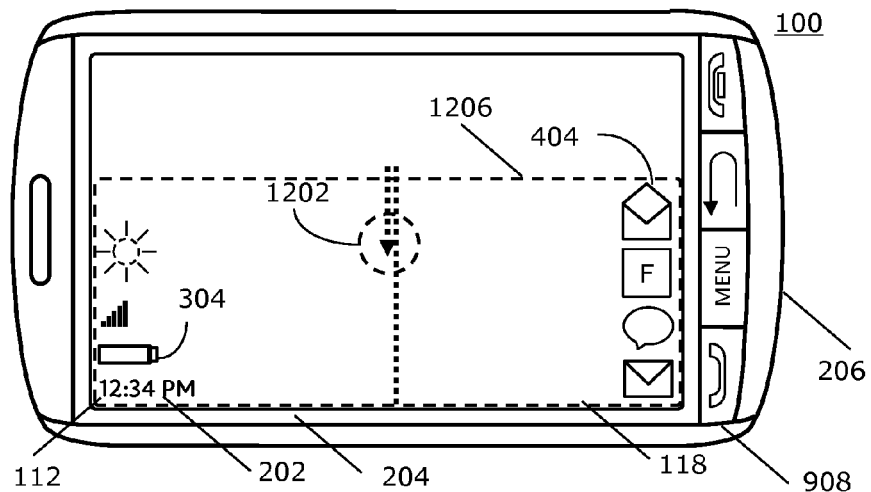

The gesture continues to be detected as the gesture reverses direction and continues downward to the location 1202 shown in FIG. 12. The display 118 is progressively dimmed in this example as long as the direction of the gesture continues in the reverse direction. Fewer informational icons 404 are displayed in FIG. 12 than in FIG. 11, and the area of illumination 1206 is smaller in FIG. 6 than in FIG. 5.

Alternatively, the gesture may continue upward from the bottom of the display until the gesture is detected at the touch location 1302, which results in a gesture greater than or equal to a predetermined distance or length as shown in FIG. 13. An unlock option 1302 is displayed in a window along with a keyboard 1304 to facilitate entry of a password. In this example, the informational icons 304 related to device condition are displayed in a different location, although informational icons 404 related to applications are no longer displayed.

An alternative option is shown in FIG. 14, in which the illuminated area of the display 118 increases from a point, e.g., an origin 1402 of the gesture or the center of the display. As the gesture continues to be detected, the illuminated area increases in diameter, for example the smaller area 1406 occurs earlier in the gesture than the area 1408. The informational icons 304, 404 may be displayed all at once or increasing in number as the gesture continues to be detected.

Although more of the informational icons 304, 404 are displayed as the gesture continues in the above examples, such a gradual display of the informational icons 304, 404 is not essential. For example, upon first detection of the gesture, all of the identified informational icons 304, 404 may be displayed. Such display facilitates a quick and reversible look or peek at the informational icons 304, 404 without requiring completion or continuation of the gesture, and facilitates a quick view of information followed by a quick return to a low-power condition or blank screen.

The above examples illustrate an upward and/or downward gesture beginning at the bottom of the display as the device is oriented. Optionally, different gestures or gestures associates with different edges or sides or corners may be utilized, including static or non-moving gestures. The user may be provided with the option to select the type of gesture, location of gesture, and/or origin of gesture.

When utilizing a touch-sensitive display 118 to detect a gesture, the gesture may comprise a series of taps on the touch-sensitive display 118. The detection of successive taps is detection of continuation of the gesture. A threshold time period may be applied to the detection of the sequence of taps. This series of taps may facilitate the gradual nature of modifying the visual display of informational icons. For example, a first tap may result in activating the display 112 at a first brightness level. A second tap may result in activating the display 112 at a second brightness level, and a third tap may result in activating the display 112 at a third brightness level. The third brightness level may be comparable to the normal brightness level when the device is in full active mode. The number or quantity of taps may also affect the number of informational icons 304, 404 displayed. For example, one tap may result in displaying the time icon 304, two taps may result in displaying informational icons 404 related to applications, and three taps may result in displaying all informational icons 304, 404. Alternatively, one tap may result in displaying informational icons 304 related to device condition, two taps may result in displaying all informational icons 304,404, and three taps may result in returning the display 112 to the low-power condition. The taps may be detected on the display or non-display area and need not be associated with a specific location or the same location. The number of taps may be applied to the brightness level of the display, the quantity of informational icons 304, 404 displayed, or both.

In another example utilizing a touch-sensitive display 118, the gesture may comprise a hovering touch, which may include simply detecting presence of a touch anywhere on the display 118. In one example, detection of motion or movement of the touch is unnecessary, and detection of localized contact for a pre-determined period of time is regarded as a gesture. Differing periods of time may be correlated to different brightness levels. For example, a hovering touch exceeding a first duration may result in activating the display 112 at a first brightness level. The hovering touch continuing and exceeding a second duration may result in activating the display 112 at a second brightness level, and the hovering touch continuing and exceeding a third duration may result in activating the display 112 at a third brightness level. The third brightness level may be comparable to the normal brightness level when the device is in full active mode. The different durations may be entered by a user. The duration of the hovering touch may also be applied to the quantity of informational icons 304, 404 displayed. The duration of the hovering touch may be applied to the brightness level of the display, the quantity of informational icons 304, 404 displayed, or both.

Alternatively, the brightness levels may vary linearly as a function of the duration of the long press up to the level of the normal brightness level when the device is in full active mode. This gradual effect from a black screen until the gesture is no longer detected or normal brightness level is reached.

In another example, one or more infrared sensors may be utilized to detect a simplistic but specific gesture. For example, one or more infrared sensors may detect a hand waving across the display at a predetermined distance.

The gesture may be a combination of gesture types or a compound gesture. For example, the gesture may initially comprise a 3D spatial gesture or voice command that triggers initial wakening of the device 100 followed by a touch detected by the touch-sensitive display 118 as the continuation of the gesture, which causes gradual or progressive change in display of the informational icons 304, 404, gradual or progressive change in the brightness of the display, or both.

In one example, the informational icons 304, 404 may all be displayed upon detection of a gesture during low-power condition, and the display may be gradually illuminated as the gesture continues, thus gradually waking-up the device 100. Alternatively, the informational icons 304, 404 may be gradually displayed in quantity and/or transparency as the gesture continues.

In one example, upon initial detection of the gesture at the location 302 in FIG. 3, a first level of additional information is shown within area 306. For example, the time in another location/timezone may be displayed. As the gesture progresses to the location 402 in FIG. 4, a second level of information is shown in addition to the first level of information, within the illuminated area 406. For example, the weather conditions for the other location may be displayed.

Priority levels may be associated with the informational icons 304, 404 to control the order in which the informational icons are displayed when revealed gradually. For example, when multiple locations are of interest, prioritization of the information icons may be associated by importance of the locations to the user.

Figure 15:
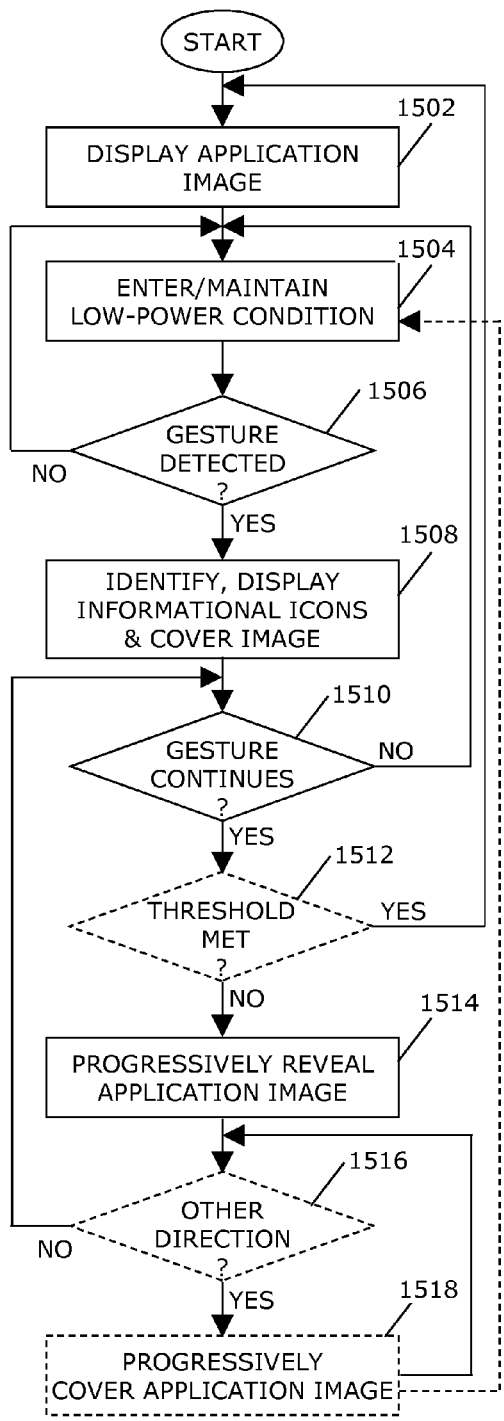

A flowchart illustrating an example of another method of controlling a display such as a touch-sensitive display is shown in FIG. 15. The method may be carried out by software executed, for example, by the processor 102 of the electronic device, which may be a portable electronic device 100. Coding of software for carrying out such a method is within the scope of a person of ordinary skill in the art given the present description. The method may contain additional or fewer processes than shown and/or described, and may be performed in a different order. Computer-readable code executable by at least one processor of the electronic device to perform the method may be stored in a computer-readable storage medium, device, or apparatus, which may be a non-transitory or tangible storage medium, device, or apparatus.

An application image is displayed 1502 by an application while the application is running, e.g., being processed by the processor 102. The application may be any application, including, but not limited to, an email application, a calendar application, a contacts application, a media application, a home page, an icon page, a web browser, or any application that may be executed by the processor or otherwise run on the electronic device 100. An application image includes any image displayed by an application, such as an image that fills the display area 202, a page or window of information, and so forth. The application image need not fill the display area 202. For example, the application image may include an inbox for a messaging application, such as a unified inbox, a received email, an email compose window, a list of upcoming calendar events, a list of most frequently accessed contacts, a media control panel and/or identification of media being played, a plurality of icons, a webpage, and so forth.

The electronic device may operate in a low-power condition, such as described above. The low-power condition may be entered and maintained 1504, for example, after a time period where no activity is detected, in response to a gesture, such as a touch at a predetermined location or in a predetermined pattern, in response to a menu entry, and so forth. The portable electronic device is maintained in a low-power condition, for example, by displaying no information on the display 112 of the touch-sensitive display 118, e.g., the display 112 is blank or black with no pixels illuminated. For example, no background or wallpaper image is displayed. The display may be turned off, for example, by turning off the backlight of an LCD or changing the pixels to black on an OLED. The electronic device 100 may enter a low-power condition while or after displaying an application image on a display.

The processing activities of the device 100 are typically significantly reduced during a low-power condition. Minimal touch sensing is active on the touch-sensitive display 118, such that power usage is minimal. For example, scanning of touch sensors may take place every 100 to 500 ms or at a reduced rate from active touch sensing when in low-power condition. While the display 112/touch-sensitive display 118/electronic device 100 is in low-power condition, an input is detected, which input may be a gesture detected on the touch-sensitive display 118, depression of a physical key, detection of input by an optical input device, or other input. The gesture may include a hovering touch or encounter resistance at the beginning of the gesture to avoid inadvertently awakening the device. In response to the input, the device at least minimally wakes-up. When a gesture is detected 1506, the process continues at 1508. The gesture may be a simple touch, such as a touch that hovers or a single tap, or a touch that moves or changes touch location as the touch continues. The gesture may include the input that awakened the device, or the gesture that wakes the device may continue to be detected as the process continues. The gesture may be simple or complex. For example, the gesture may be a swipe or moving touch that moves in a single direction along the display or a touch that hovers or is maintained at or near the same location. Any other gesture may be utilized. The gesture may begin anywhere on the touch-sensitive display 118, although advantage may be gained, for example, by detecting a touch starting at any edge of the display, such as the bottom of the display, as perceived by a user, or a corner of the display. The gesture may be part of a gesture that continues and provides additional functions, as described below. The gesture may be a series or sequence of taps on the touch-sensitive display 118. The location of the taps may or may not be relevant to detecting the gesture.

Informational icons 304, 404 are identified and displayed 1508 with a cover image. The cover image may be simple or complicated. The cover image may simply be a blank or black screen. Alternatively, the cover image may be a blank or black screen with minimal information such as time, date, and so forth. For example, the cover image may include the time, a date, a message, a design or pattern 1806 such as shown in FIG. 18, a photo, one or more images previously stored on the device 100, any combination of elements, and so forth. The cover image may cover the available display area and may be the same size or larger than the application image. Identifying informational icons 304, 404 includes, for example, identifying at least one notification to be displayed. Notifications include, for example, notice of a received email, notice of a text message, notice of a missed phone call, a calendar event, a social networking notice, device condition, and so forth. Device conditions include, for example, time of day, date, battery level, network signal strength indication, error condition, software problem, and so forth. Informational icons 304, 404 that are associated with each notification are identified and displayed, such as an envelope for email, a balloon for a text message, a phone for a missed call, an open envelope for a meeting invitation, and so forth. All of the informational icons 304, 404 identified at 1508 may be displayed upon detection of the input or gesture. Alternatively, the informational icons 304, 404 may be progressively or gradually displayed while the gesture is continuously detected, e.g., the quantity of informational icons 304, 404 increases, such as one at a time as the gesture continues 1510. Alternatively, the informational icons 304, 404 may be gradually displayed or revealed as the gesture is continuously detected. This effect may be achieved by progressively decreasing the transparency of the displayed informational icons 304, 404, e.g., starting with a transparent or ghosted version of the icon and gradually increasing the opacity of the icon 304, 404 until the informational icons 304, 404 are fully displayed. Transparency in this sense includes the visual effect of being able to see the background through the icons 304, 404. Increasing the opacity of the icon 304, 404 includes reducing the amount of background visible through the icon 304, 404 until to the background cannot be seen through the icon 304, 404 anymore. Transparency or opacity is a visual effect that may be implemented on a pixel by pixel basis such that the pixels are manipulated to appear as though one image is overlaying another image or is, to a lesser or greater extent, visible compared to the other.

While detection of the gesture continues 1510, and a gesture threshold is not met 1512, an application image is progressively revealed 1514 while displaying the cover image and optionally the identified informational icons 304, 404, such as described above. Detection of the gesture continuing includes detecting a continuation of the gesture's movement along the touch-sensitive display 118 and/or detecting a continuation of the gesture in time at or near a single location on the touch-sensitive display 118, e.g., a successive tap with little or no movement of the gesture. The gesture may include a combination of movement and holding of a touch at or near one location on the display 118. The application image that is progressively revealed may be the same image that was displayed when the low-power condition was entered, e.g., the application image displayed immediately before entering the low-power condition. Alternatively, the application image may be another application image, such as an inbox, such as a universal or unified inbox; a last received message, such as a message received within a predetermined period of time of detecting the gesture 1506; an application image selected by a user, such as through a menu; and so forth. The application image may be one of a plurality of different application images depending on the circumstances, such as a last received message if received within a predetermined period of time of detecting the gesture 1506, otherwise the application image displayed immediately before entering the low-power condition is displayed. Alternatively, the application image may be an image displayed only after entering a low-power condition. The image may comprise information that may be useful during the revealing process, such as the entries of a messaging inbox that may be revealed chronologically beginning with the last received message, and thus may comprise at least part of an inbox that may be displayed upside-down so that the latest information is revealed first when the gesture begins at the bottom of the display. The application image may be shown during the revealing, and once the device is fully awakened, display of the application image may discontinue, after which the device may revert to the last application open on the display when the low-power condition was entered.

Figure 24:
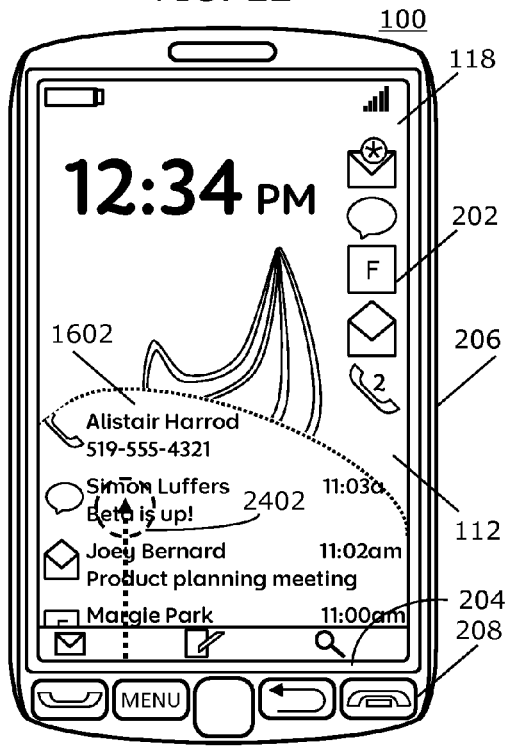
Figure 25:
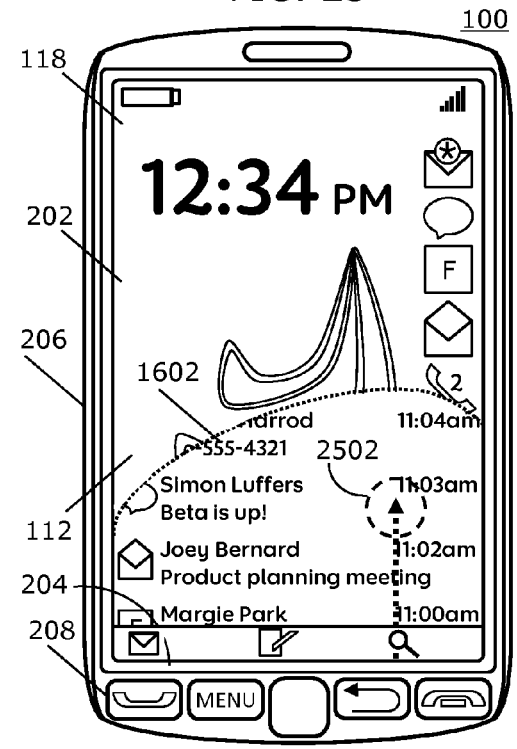

Progressively revealing the application image may be performed in a number of ways. For example, the application image may be revealed beginning at the one end of the application image or display 112 and continuing toward an opposite end of the application image or the display 112, such as shown in the examples of FIG. 18 through FIG. 25. A more particular example of progressively revealing includes a sunrise effect, where the application image is first displayed at the bottom of the display 118 and gradually revealed more and more in a direction toward the top of the display 118 in a similar manner as a sunrise. The area or extent of the revealed image may be greater near the touch and taper off toward one or more of the sides of the display, such as shown in FIG. 18 through FIG. 25. When the touch is at the center of the display, the sunrise effect is centered across the display, such as shown in FIG. 18 through FIG. 23. When the touch is detected near a side of the display, the sunrise effect is offset toward the touch location, and less of the application image is displayed near the opposite side of the display where the touch is detected, such as shown in FIG. 24 and FIG. 25. Another form of progressively revealing the application image comprises gradually revealing the application image beginning at a point, such as the center of the display 118 or the first detected touch location, and gradually revealing more of the application image in at least one direction away from the point, such as shown in FIG. 14, which shows increasing in a circle or radially outwardly in all directions from a point on the display 118. Progressively revealing includes changing the cover image to the application image.

Progressively revealing the application image includes displaying more of the application image along with movement of the gesture or as the gesture continues to be detected, while displaying less of the cover image and/or the informational icons 304, 404. For example, the more the gesture moves, more area of the application image is displayed. Thus, the rate of movement of the gesture may affect the rate of progressively displaying the application image or the rate of increases area in which the application image is displayed. For example, progressively revealing may comprise gradually increasing a size of an area of the application image that is displayed while gradually decreasing a size of an area of the cover image that is displayed. The number of informational icons 304, 404 may also be reduced depending on how much of the application image is revealed. Progressively revealing includes gradually reducing display of the cover image while gradually increasing display of the application image. For example, the application image and the cover image together may cover most or all of the available display area for the display 112. Thus, as display of the application image increases by a first amount or area, the display of the cover image is reduced by the same amount or area. The cover image may simply be discontinued, and appear to disappear or be "erased" from the display as the gesture continues. Alternatively, the area of the cover image may be reduced but the image may be shrunk to fit in the area remaining for the cover image. The available display area may include headers or footers of the display or may exclude headers or footers of the display. Thus, the application image is progressively revealed along with movement of the gesture, e.g., as the touch location changes, while reducing display of the cover image. Alternatively, progressively revealing may include altering the transparency or opacity of the images as the gesture continues. For example, the application image may begin as fully transparent across the entire image when the gesture begins and gradually progress to being opaque across the entire image as the gesture progresses away from the initial gesture location, while the cover image may begin as fully opaque across the entire image when the gesture begins and gradually progress to being transparent or across the entire image as the gesture progresses away from the initial gesture location.

Optionally, when the gesture meets a predetermined threshold 1512, such as detection for a period of time, a distance or length of the gesture, or reaching a location on the display, the application image is fully displayed and the cover image is no longer displayed. At any time detection of the gesture ends before meeting the threshold at 1512, low-power condition is entered 1504 and display of the cover image is discontinued. This discontinuance of display of the cover image may be effectively instantaneous or immediate or may quickly fade to black, e.g., in 100 to 500 ms or less. For example, a user may simply wish to check the time or the informational icons, and an end of the gesture returns the device to low-power condition.

Another option includes progressively covering the application image after beginning to reveal the application image. For example, upon detection 1516 of a change in direction of the gesture, display of the application image may be progressively reduced or the application image is progressively covered as the gesture continues in the new direction. The new direction may be, for example, opposite the previous direction of the gesture or in a direction toward the initial touch location of the gesture. Opposite may include any aspect of the gesture that is in a direction toward the original touch location of the gesture rather than away from the original touch location, such as any component toward the original touch location or edge of the display versus a component away from the original touch location or edge of the display. Progressively covering the application image includes displaying less of the application image and more of the cover image along with movement of the gesture. While the gesture continues in the new direction, the process continues by progressively covering the application image as the gesture continues to be detected. When the gesture changes direction again, the process continues at 1510, and when the application image is covered or the gesture ends, the process continues at 1504. In a more specific example, the gesture may comprise a touch beginning at the bottom of the display 118 and moving toward the top of the display, followed by moving back toward the bottom of the display 118, such as when the user sees as much information as desired. In this situation, the application image is gradually revealed until the touch is detected moving back toward the bottom of the display 118, at which time the application image is progressively covered 1518 until the gesture ends, e.g., detection of the gesture does not continue, at 1510; the gesture meets a gesture threshold, such as returning to or near its beginning or initiation location, such as an edge of the touch-sensitive display 118, in which case the low-power condition is entered 1504; or the gesture changes direction again to progressively reveal more of the application image, in which case the process continues at 1510. An end of the gesture may be discontinuation of detection of touch data on the touch-sensitive display 118, discontinuation of a recognizable 3D spatial gesture, or end of any other type of gesture. The gesture may be discontinued, for example, when a user gathered the information the user is interested in, such as time, date, notifications, and so forth. An end of the gesture at 1510 returns the device 100 to the low-power or sleep condition.

Figure 16:
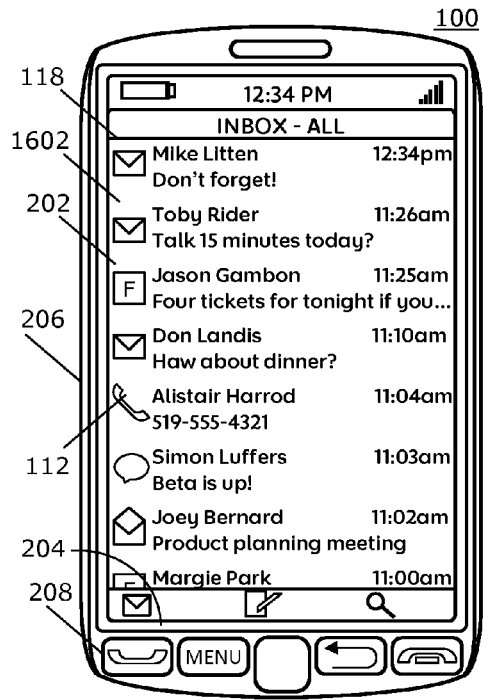
Figure 17:
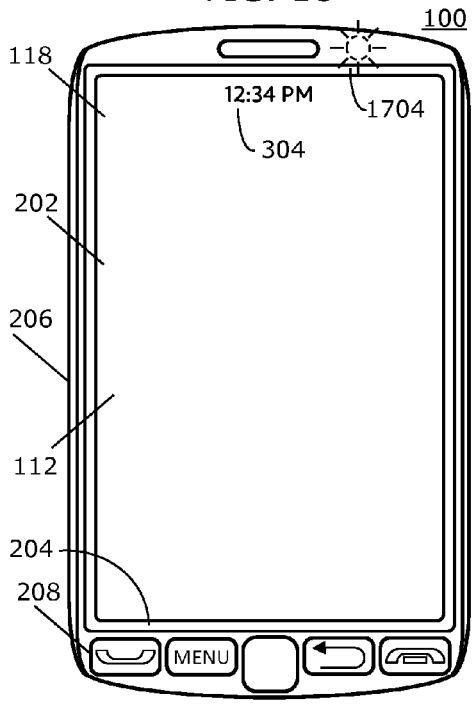

Examples illustrating revealing an application image are shown in FIG. 16 through FIG. 25. Some of the reference numerals are not repeated in subsequent figures for the sake of simplifying the drawings and making them easier to view. Although shown in portrait orientation, these examples may be implemented in landscape orientation. In this example, a unified inbox 1602 is displayed from a messaging application as shown in FIG. 16. While the application image is in the state shown in FIG. 16, a trigger to enter low-power condition is met. The electronic device 100 enters the low-power condition, including placing the display 112/touch-sensitive display 118 in a low-power condition, such as shown in FIG. 17. Typically, no information is displayed on the display 112 during the low-power condition, including no display of a background image or other image. Optionally, a simple image such as the time or a clock may be displayed during low-power condition, although the remainder of the display is blank or black to reduce power. The backlight may operate at a reduced brightness level for an LCD or a minimal number of pixels may be illuminated for an OLED. The device 100 may include a separate light emitting diode 1704 that may operate at any time, including during low-power mode, to notify a user when a message is received.

An input is detected during the low-power condition. In this example, the input is part of the gesture that begins at the touch location 1802 shown in FIG. 18. In response to detecting the gesture, a cover image is displayed including a design 1806 and the time. Information icons 304 including a battery level and signal level indicator are displayed as well as a plurality of messaging icons 404. The icons 304, 404 may be displayed anywhere on the display 112. The messaging icons 404 may include a symbol (top icon 404) or a number (bottom icon 404) indicating unread messages related to application related to that icon.

The gesture continues, and at the touch location 1902 shown in FIG. 19, the application image 1602 is revealed from a first end of the application image or display 112. In this example, the application image is revealed from an edge of the display nearest to the touch location 1802 where the gesture began, which is the bottom of the display in this example. Thus, the gesture that brought the device out of the low-power condition continues and reveals the application image. The border 1904 between the application image 1602 and the cover image 1906 is shown as a dotted line in this example. The border may alternatively be a blend of the two images such as both images being semi-transparent, a special effect such as a halo, glow, or other effect, a solid line, and so forth. The border may be simple, where one image begins, the other image ends, e.g., nothing additional is displayed. The border may be thin, such as shown in FIG. 19, or thicker.

As the gesture continues to the touch location 2002 shown in FIG. 20, more of the application image is revealed. The reveal of the application image may precede the current touch location, e.g., the application image may be displayed or revealed a distance from the current touch location, for example, in the direction of the gesture. The distance may be the same as the gesture continues along the display or may change the longer the gesture persists. For example, the edge 1904 of the revealed application image in FIG. 19 is closer to the touch location 1902 than the edge 2004 of the revealed application image in FIG. 20 is to the touch location 2002.

The gesture continues to the touch location 2102 shown in FIG. 21, where a significant part of the application image is revealed. As the gesture continues in a first direction toward the top of the display or away from the initial location 1802 of the gesture, more of the application image is revealed along with movement of the gesture. Thus, when the gesture moves in the first direction, the application image is progressively revealed from a first end of the application image or display 112 toward a second end of the application image or display 112 opposite the first end along with movement of the gesture. The first end of the application is nearest the initial touch location of the gesture in this example.

As shown in the examples, the application image extends across the display 112 from a first edge of the display to second edge of the display opposite the first edge. For example, the application image may extend horizontally across the width of the display in either portrait orientation or landscape orientation. As the gesture continues toward the top of the display, the application image is displayed across the display, and the height or area of the application image increases.

Figure 22:
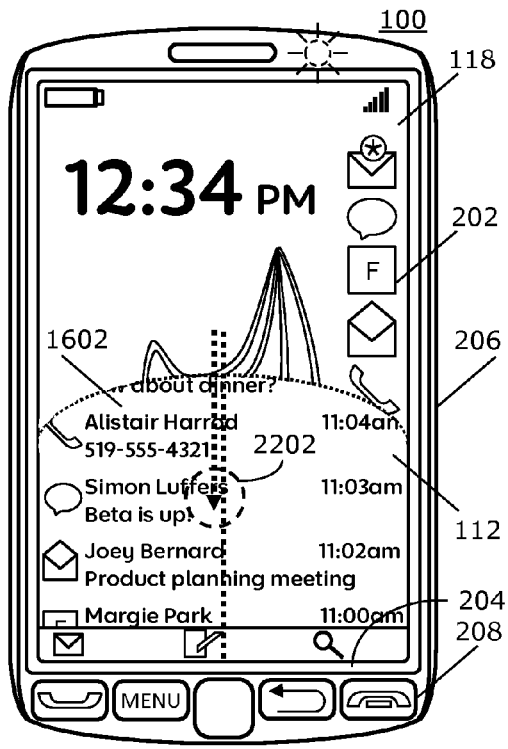

A change in the direction of the gesture is detected, as shown in FIG. 22, where the current location of the gesture is at the touch location 2202 lower than the touch location 2102 of FIG. 21 earlier in the gesture. In the examples of FIG. 18 through 21, the gesture moves in a first direction, and in FIG. 22, the gesture moves in a second direction opposite to the first direction. In response to movement of the gesture in this second direction, the application image is progressively covered by displaying more of the cover image and less of the application image. In this example, as the gesture continues in a downward direction, more of the cover image is displayed as less of the application image is displayed along with movement of the gesture. The application image is covered with the cover image from the second end toward the first end as the gesture moves in the second direction.

Figure 23:
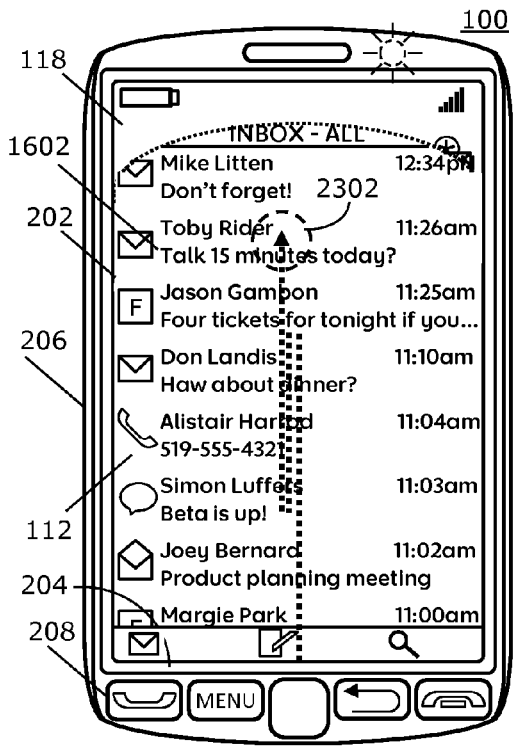

The gesture changes direction again, back to the first direction, as shown in FIG. 23, where the current location of the gesture is at the touch location 2302 higher than the touch location 2202 of FIG. 22 earlier in the gesture. The application image is revealed again as the gesture continues in the first direction. Thus, the application image is progressively revealed as the gesture moves in the first direction, and the application image is progressively covered by gradually displaying more of the cover image as the gesture moves in a second direction opposite the first direction. When the gesture continues and meets a threshold, such as a duration of time, a length, or a location on the display, such as a location 90-100% of the way to the opposite end of the display as the touch originated, the application image is fully displayed and the cover image is no longer displayed. Operation in the application may continue once the cover is no longer displayed. The application may be considered to be running in a state while the application image is displayed prior to entering the low-power condition, which state may be returned to later, such as after exiting low-power condition. Operation of the application may continue from the state when the gesture meets the threshold. When the gesture ends before meeting the threshold, neither the application image nor the cover image are displayed, and the low-power condition is entered.

The examples shown in FIG. 3 through FIG. 6 and FIG. 9 through FIG. 12, the progressive illumination occurs evenly across the display. In the examples shown in FIG. 16 through FIG. 25, the application image is progressively revealed unevenly across the display. When the touch is at the center of the display, the image is centered across the display, such as shown in FIG. 18 through FIG. 23, where the application image is revealed more in the center of the display than near the sides of the display. When the touch is detected near a side of the display, the application image is revealed more in a manner offset toward the touch location, and less of the application image is displayed near the opposite side of the display where the touch is detected, such as shown in FIG. 24 and FIG. 25. As shown in FIG. 24, the touch location 2402 is toward the left of the display, and the application image is revealed higher nearest the touch on the left side while the application image is revealed to a lower extent away from the touch location 2402 on the right side of the display. As shown in FIG. 25, the touch location 2502 is toward the right of the display, and the application image is revealed higher nearest the touch on the right side while the application image is revealed to a lower extent away from the touch location 2502 on the left side of the display. Thus, the application image may be revealed unevenly across the display, where more of the application image is revealed near the current touch location than to a side of the current touch location. Progressive illumination may alternatively occur unevenly across the display, and the application image may be progressively revealed evenly across the display.

The various processes or features of the example described in FIG. 15 through 25 may be applied to the other examples described in FIG. 2 through FIG. 14, and vice versa. For example, an unlock option, such as described above with respect to FIG. 7, FIG. 8, and FIG. 13, may be displayed when the gesture continues for at least a predetermined period of time or at least a predetermined distance. The unlock screen may be displayed until a password is successfully entered. The unlock screen may be displayed after the cover image is no longer displayed, and the application image is fully displayed to prevent further disclosure of information without password entry. Thus, a limited amount of information may be revealed prior to the successful entry of a password. This limited amount of information may be, for example, non-confidential information, such as phone numbers of missed calls, identities of senders of emails or text messages, upcoming meeting notices, time and date, and so forth. Other information may be displayed, e.g., when security is not an issue.

The illuminated areas 306, 406, 506, 606, 906, 1006, 1106, and 1206 in need not be rectangles, and may be any suitable shape, for example, semi-circular, circular, elliptical, or other shape including complex shapes.

Optionally, contrast levels of the image being displayed may be varied in order to achieve the same or similar result as progressively varying the brightness of the display.

Although information, such as informational icons, keys, or an unlock option, is shown displayed in particular locations in the example, the information may be displayed in any location on the display.

Although the method is advantageous for portable electronic devices due to the limited display size on a portable electronic device, such as a smartphone, the method may be applied to other electronic devices that have a larger display size.

The location of informational icons may be adjusted by the user. For example, the use may identify the quantity, order, or arrangement of informational icons to be displayed.

A method comprises, while a touch-sensitive display is in a low-power condition, detecting a gesture on the touch-sensitive display and identifying any informational icons to be displayed. While the gesture continues to be detected, the touch-sensitive display is progressively illuminated while displaying the identified informational icons. When the gesture comprises a touch at or near a single location on the display, detecting continuation of the gesture may comprise continually detecting the touch. A portable electronic device may comprise the touch-sensitive display.

A method comprises, while a portable electronic device is in a low-power condition, detecting, by the portable electronic device, a gesture. Any informational icons to be displayed are identified. The identified informational icons are displayed without fully illuminating a display of the portable electronic device. Discontinuation of the gesture may result in a return to the low-power condition in which the display is not illuminated. Displaying the identified informational icons may comprise illuminating the informational icons without illuminating a remainder of the display, e.g., an area of the display where the informational icons are not displayed.

Although the above examples illustrate various different features, the features of any example may be utilized with any other example unless the features conflict. For example, features of FIG. 2 through 7 may be utilized in a landscape orientation, and features of FIG. 9 through 14 may be utilized in a portrait orientation. Other features are interchangeable but are too numerous to identify briefly.

The terms left, right, top, bottom, and so forth are utilized herein for purpose of providing a perspective for reference but are not otherwise limiting.

Advantages of the method include providing the ability for the user to gain information from a device without requiring a full wake-up of the device at the normal brightness level of the device. Previously, when a device was asleep or locked, a notification that a new communication was received was viewable only after fully illuminating the display and awakening the device. When the user only wanted to check the time, the user was required to fully illuminate or wake-up the device. In both cases, fully awakening the device may be disadvantageous in terms of power consumption and time to access the desired information. In some situations, fully illuminating the device may be undesirable. For example, in dark locations, light could disrupt the user or other people, e.g., in a theatre, cinema, while in bed, and so forth. A gradual wake-up in these situations avoids unnecessary disruption, and possibly reduces power consumption. Advantageously, power consumption of an OLED display is reduced because a black OLED pixel consumes negligible power compared to a white OLED pixel. Therefore, by reducing the brightness levels and/or reducing the illuminated area of the display reduces power consumption. A cover image may optionally be displayed, which cover image may comprise a very dark, e.g., navy blue or nearly black, image that covers the display while an application image is gradually revealed.

Another advantage results from the reversible capability of this method. Either changing direction of the gesture or discontinuing the gesture results in the device returning to the low power condition by dimming the display. This dimming is a particular benefit for users who only want to perform a quick check on their device, e.g., device conditions and/or notifications, and who want to quickly return to the sleep state without requiring a time period to elapse. This capability is useful for users who forget to lock their device, which may result in unintended action of the device, such as "pocket dialing."

Furthermore, physical keys used to unlock devices are normally placed on top, bottom, or along the sides of devices. When a user desires to utilize one hand to operate the device, pushing unlock buttons may require a shift in grip or inability to operate the device with one hand. Many of the examples do not require a user to shift grip to proceed with operating the device.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   entering, by a portable electronic device, a low-power condition in which no area of a touch-sensitive display of the portable electronic device is illuminated and no information is displayed on the display, after displaying an application image on a display;
   while in the low-power condition, detecting a single gesture that begins on or near a first end of the touch-sensitive display and progresses toward a second end, opposite the first end of the touch-sensitive display;
   in response to detecting the single gesture on the touch-sensitive display, displaying a cover image including notifications comprising at least one of a notice of a received email message, a notice of a received text message, a notice of a missed phone call, a notice of a calendar event, or a social networking notice;
   in response to detecting continuation of the single gesture toward the second end, progressively revealing the application image by gradually increasing a size of an area in which a portion of the application is displayed, from the first end of the touch-sensitive display toward the second end of the touch-sensitive display while reducing display of the cover image such that the single gesture controls the size of the portion of the application that is displayed, such that the cover image, including the notifications, is displayed and the application is revealed by a single touch comprising the single gesture that begins when the touch-sensitive display is not illuminated and no information is displayed, at a location on or near the first end of the touch-sensitive display and progresses toward the second end;
   in response to detecting a change in direction and continuation of the single gesture toward the first end after progressively revealing the application image, progressively covering the application image along with movement of the single gesture by decreasing the portion of the application that is displayed while increasing display of the cover image; and
   in response to detecting an end of the single gesture before the single gesture meets a threshold, discontinuing display of the cover image and returning to the low-power condition such that the end of the single gesture returns the portable electronic device to the low-power condition in which no area of the touch-sensitive display is illuminated and no information is displayed on the display.

2. The method of claim 1, wherein progressively revealing comprises revealing the application image from a first end of the application image and gradually revealing more of the application image toward a second end of the application image opposite the first end as the single gesture moves from the first end of the touch-sensitive display toward the second end of the touch-sensitive display.

3. The method of claim 2, wherein the first end of the application image extends across the touch-sensitive display from a first edge of the touch-sensitive display to a second edge of the touch-sensitive display opposite the first side and the second end of the application image extends across the touch-sensitive display from the first edge to the second edge.

4. The method of claim 1, wherein the first end of the application image corresponds with the first end of the touch-sensitive display such that the single gesture begins near the first end of the application image.

5. The method of claim 1, further comprising, in response to detecting that the single gesture ends at or near the first end of the display, discontinuing display of the application image, discontinuing display of the cover image, and returning to the low-power condition such that the end of the single gesture returns the portable electronic device to the low-power condition in which no area of the touch-sensitive display is illuminated and no information is displayed on the display.

6. The method of claim 1, further comprising, when the single gesture meets the threshold, displaying the application image and discontinuing display of the cover image.

7. The method of claim 1, wherein an application is running in a state when the low-power condition is entered, further comprising continuing operation of the application at the state when the single gesture meets the threshold.

8. The method of claim 1, wherein the application image is revealed unevenly across the touch-sensitive display, wherein more of the application image is revealed near a current touch location of the single gesture than to a side of the current touch location.

9. A non-transitory computer-readable medium storing instructions to cause a processor to perform operations comprising:
   entering, by a portable electronic device, a low-power condition in which no area of a touch-sensitive display of the portable electronic device is illuminated and no information is displayed on the display, after displaying an application image on a display;
   while in the low-power condition, detecting a single gesture that begins on or near a first end of the touch-sensitive display and progresses toward a second end, opposite the first end of the touch-sensitive display;
   in response to detecting the single gesture on the touch-sensitive display, displaying a cover image including notifications comprising at least one of a notice of a received email message, a notice of a received text message, a notice of a missed phone call, a notice of a calendar event, or a social networking notice;
   in response to detecting continuation of the single gesture toward the second end, progressively revealing the application image by gradually increasing a size of an area in which a portion of the application is displayed, from the first end of the touch-sensitive display toward the second end of the touch-sensitive display while reducing display of the cover image such that the single gesture controls the size of the portion of the application that is displayed, such that the cover image, including the notifications, is displayed and the application is revealed by a single touch comprising the single gesture that begins when the touch-sensitive display is not illuminated and no information is displayed, at a location on or near the first end of the touch-sensitive display and progresses toward the second end;
   in response to detecting a change in direction and continuation of the single gesture toward the first end after progressively revealing the application image, progressively covering the application image along with movement of the single gesture by decreasing the portion of the application that is displayed while increasing display of the cover image; and
   in response to detecting an end of the single gesture before the single gesture meets a threshold, discontinuing display of the cover image and returning to the low-power condition such that the end of the single gesture returns the portable electronic device to the low-power condition in which no area of the touch-sensitive display is illuminated and no information is displayed on the display.

10. An electronic device comprising:
a non-transitory computer-readable storage medium coupled to the one or more processors and storing programming instructions for execution by the one or more processors, the programming instructions instruct the one or more processors to:
   enter a low-power condition in which no area of a touch-sensitive display of the portable electronic device is illuminated and no information is displayed on the display, after displaying an application image on a display;
   while in the low-power condition, detect a single gesture that begins on or near a first end of the touch-sensitive display and progresses toward a second end, opposite the first end of the touch-sensitive display;
   in response to detecting the single gesture on the touch-sensitive display, display a cover image including notifications comprising at least one of a notice of a received email message, a notice of a received text message, a notice of a missed phone call, a notice of a calendar event, or a social networking notice;
   in response to detecting continuation of the single gesture toward the second end, progressively reveal the application image by gradually increasing a size of an area in which a portion of the application is displayed, from the first end of the touch-sensitive display toward the second end of the touch-sensitive display while reducing display of the cover image such that the single gesture controls the size of the portion of the application that is displayed, such that the cover image, including the notifications, is displayed and the application is revealed by a single touch comprising the single gesture that begins when the touch-sensitive display is not illuminated and no information is displayed, at a location on or near the first end of the touch-sensitive display and progresses toward the second end;
   in response to detecting a change in direction and continuation of the single gesture toward the first end after progressively revealing the application image, progressively cover the application image along with movement of the single gesture by decreasing the portion of the application that is displayed while increasing display of the cover image; and
   in response to detecting an end of the single gesture before the single gesture meets a threshold, discontinue display of the cover image and returning to the low-power condition such that the end of the single gesture returns the portable electronic device to the low-power condition in which no area of the touch-sensitive display is illuminated and no information is displayed on the display.

* * * * *